United States Patent
Salimi et al.

(10) Patent No.: US 12,070,878 B2
(45) Date of Patent: Aug. 27, 2024

(54) MODULAR MOLDING UNITS FOR FABRICATION OF WIND TURBINE BLADES

(71) Applicant: TPI Composites, Inc., Warren, RI (US)

(72) Inventors: Amir Salimi, Providence, RI (US); Karsten Schibsbye, Fredericia (DK)

(73) Assignee: TPI Composites, Inc., Warren, RI (US)

( * ) Notice: Subject to any disclaimer, the term of this patent is extended or adjusted under 35 U.S.C. 154(b) by 7 days.

(21) Appl. No.: 17/592,928

(22) Filed: Feb. 4, 2022

(65) Prior Publication Data
US 2022/0242011 A1 Aug. 4, 2022

Related U.S. Application Data

(60) Provisional application No. 63/145,788, filed on Feb. 4, 2021.

(51) Int. Cl.
*B29C 33/30* (2006.01)
*B29C 33/00* (2006.01)
(Continued)

(52) U.S. Cl.
CPC ........ *B29C 33/301* (2013.01); *B29C 33/0061* (2013.01); *B29C 33/26* (2013.01); *B29C 70/48* (2013.01); *B29L 2031/085* (2013.01)

(58) Field of Classification Search
CPC ... B29C 33/301; B29C 33/0061; B29C 33/26; B29L 2031/085
(Continued)

(56) References Cited

U.S. PATENT DOCUMENTS 7,223,091 B2 * 5/2007 Olsen .................... B29C 69/004
264/319
8,572,845 B2 * 11/2013 Rajasingam ............ B29C 33/26
29/889.7
(Continued)

FOREIGN PATENT DOCUMENTS

WO WO-2017171703 A1 * 10/2017 ........... B29C 70/342

OTHER PUBLICATIONS

International Search Report and Written Opinion for International Application No. PCT/US2022/015182 dated Jun. 6, 2022.

*Primary Examiner* — Michael A Tolin
*Assistant Examiner* — Hana C Page
(74) *Attorney, Agent, or Firm* — Stephen J. Kenny; Foley Hoag LLP

(57) ABSTRACT

Devices, systems, and methods for modular molding of wind turbine blades are provided. Methods of molding wind turbine blades using a modular molding assembly or system and methods of substituting molds are provided. In some embodiments, a modular assembly includes a first base frame and a second base frame hingedly coupled to one another, a first tooling frame disposed on the first base frame, a second tooling frame disposed on the second base frame, a first shell mold coupled to the first tooling frame, and a second shell mold coupled to the second tooling frame. The first shell mold has a first mold surface and a first perimeter and the second shell mold has a second mold surface and a second perimeter. When in an open configuration, the first base frame is coplanar with the second base frame, and, in a closed configuration, the first perimeter contacts the second perimeter.

16 Claims, 7 Drawing Sheets

(51) Int. Cl.
    *B29C 33/26*      (2006.01)
    *B29C 70/48*      (2006.01)
    *B29L 31/08*      (2006.01)
(58) Field of Classification Search
    USPC .......................................................... 425/182
    See application file for complete search history.

(56)            References Cited

U.S. PATENT DOCUMENTS 9,492,973 B2 *  11/2016  Datta ..................... B29C 70/443
 2012/0090789 A1 *   4/2012  Starke ................... B29C 33/301
                                                            264/219
 2014/0327178 A1 *  11/2014  Davis ...................... B29C 33/02
                                                            264/258
 2018/0171968 A1     6/2018  Hunter
 2019/0193304 A1     6/2019  Davis et al.
 2020/0122416 A1     4/2020  Salimi et al.
 2020/0147912 A1 *   5/2020  Thomsen ............ B29C 66/1142

* cited by examiner

400

402 providing an assembly, the assembly comprising:
a first base frame having a first plurality of arms having a first plurality of perpendicular projections;
a second base frame having a second plurality of arms, the second plurality of arms having a second plurality of perpendicular projections, the second base frame hingedly coupled to the first base frame;
a first tooling frame having a first plurality of recesses corresponding to the first plurality of perpendicular projections, the first tooling frame disposed on the first base frame;
a second tooling frame having a second plurality of recesses corresponding to the second plurality of perpendicular projections, the second tooling frame disposed on the second base frame;
a first shell mold coupled to the first tooling frame, the first shell mold having a first mold surface and a first perimeter;
a second shell mold coupled to the second tooling frame, the second shell mold having a second mold surface and a second perimeter;
wherein, in an open configuration, the first base frame is coplanar with the second base frame; and,
in a closed configuration, the first perimeter contacts the second perimeter.

↓

404 removing the first shell mold and first tooling frame from the first base frame;

↓

406 removing the second shell mold and the second tooling frame from the second base frame;

↓

408 disposing a third tooling frame having a third plurality of recesses on the first base frame, the third tooling frame coupled to a third shell mold that is different from the first shell mold;

↓

410 disposing a fourth tooling frame having a fourth plurality of recesses on the second base frame, the fourth tooling frame coupled to a fourth shell mold that is different from the second shell mold.

FIG. 7

MODULAR MOLDING UNITS FOR FABRICATION OF WIND TURBINE BLADES

CROSS-REFERENCE TO RELATED APPLICATIONS

This application claims the benefit of priority under 35 U.S.C. § 119(e) of U.S. Provisional Application No. 63/145,788 filed Feb. 4, 2021, the entire contents of which are hereby incorporated by reference.

BACKGROUND

Embodiments of the present disclosure relate to devices, assemblies, and systems for modular molding of composite structures, e.g. wind turbine blades. Methods of molding wind turbine blades using a modular molding assembly or system and methods of substituting molds are provided.

BRIEF SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an assembly comprising a first base frame having a first plurality of legs and a second base frame having a second plurality of legs. The first plurality of legs have a first plurality of perpendicular projections and the second plurality of legs have a second plurality of perpendicular projections. The second base frame is hingedly coupled to the first base frame. The assembly further includes a first tooling frame having a first plurality of recesses corresponding to the first plurality of perpendicular projections and a second tooling frame having a second plurality of recesses corresponding to the second plurality of perpendicular projections. The first tooling frame is disposed on the first base frame and the second tooling frame is disposed on the second base frame. The assembly further includes a first shell mold coupled to the first tooling frame and a second shell mold coupled to the second tooling frame. The first shell mold has a first mold surface and a first perimeter and the second shell mold has a second mold surface and a second perimeter. In an open configuration, the first base frame is coplanar with the second base frame. In a closed configuration, the first perimeter contacts the second perimeter.

The disclosed subject matter further includes a method of blade closure using a modular mold for wind turbine blade manufacture. A modular molding assembly for a wind turbine blade as described above is provided. A first blade half is fabricated on the first mold surface and a second blade half is fabricated on the second mold surface. The second base frame, second tooling frame, and second mold are rotated about the hinge axis. The first perimeter of the first mold surface is contacted with the second perimeter of the second mold surface.

The disclosed subject matter further includes a method of substituting wind turbine shell molds in a modular assembly for wind turbine blade manufacture. A modular molding assembly for a wind turbine blade as described above is provided. The first shell mold and first tooling frame are removed from the first base frame. The second shell mold and the second tooling frame are removed from the second base frame. A third tooling frame having a third plurality of recesses is disposed on the first base frame. The third tooling frame is coupled to a third shell mold that is different from the first shell mold. A fourth tooling frame having a fourth plurality of recesses is disposed on the second base frame. The fourth tooling frame is coupled to a fourth shell mold that is different from the second shell mold.

BRIEF DESCRIPTION OF THE SEVERAL VIEWS OF THE DRAWINGS

FIG. 7 illustrates a method of substituting wind turbine shell molds in a modular assembly for wind turbine blade manufacture according to embodiments of the present disclosure.

DETAILED DESCRIPTION

Figure 1:
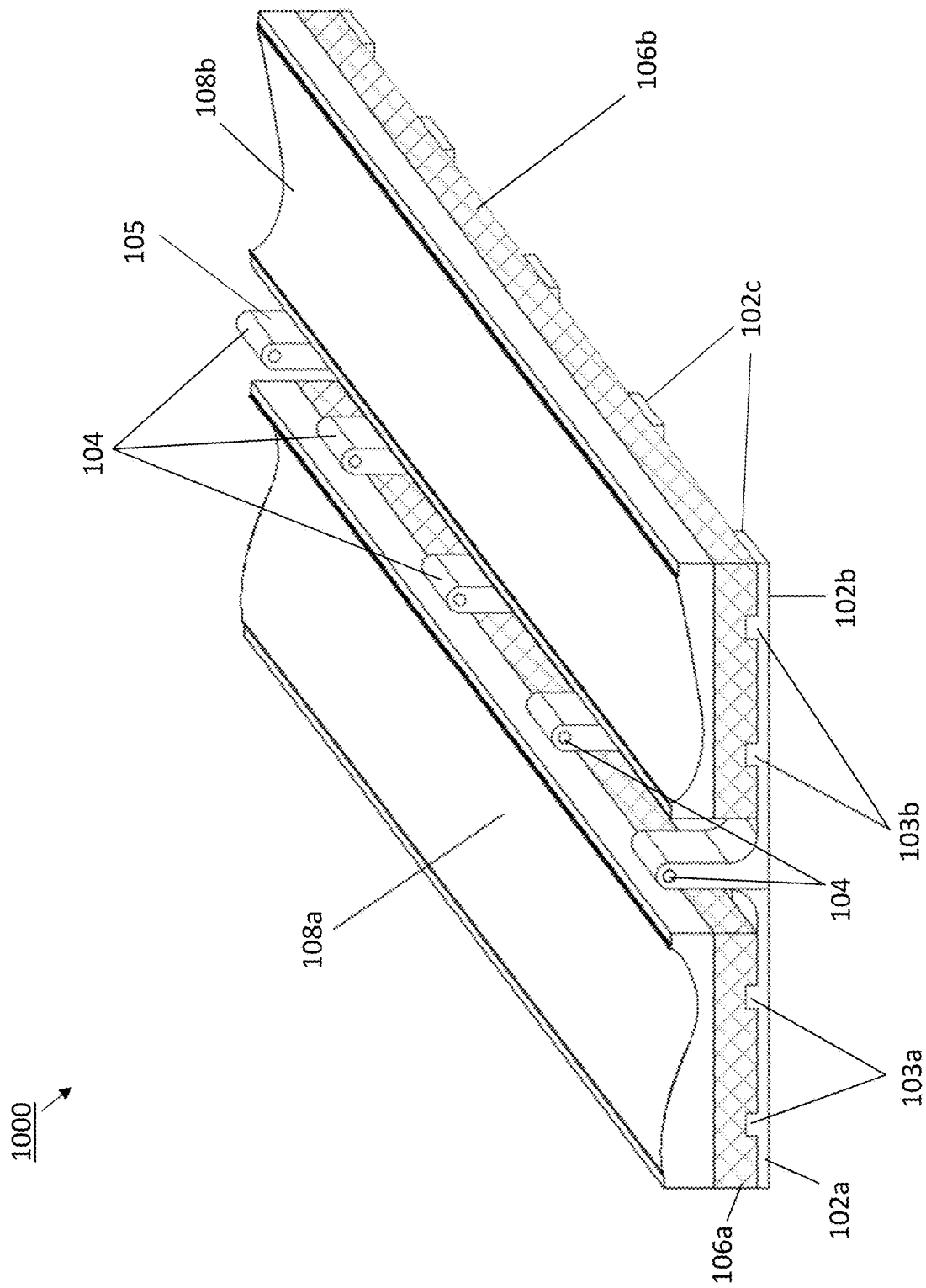
FIG. 1 illustrates an exemplary modular molding assembly for wind turbine blade manufacture according to embodiments of the present disclosure.

Modern wind turbine rotor blades are built from fiber-reinforced plastics as fiber-reinforced plastics have high strength-to-weight ratios. A rotor blade typically includes an airfoil shape having a rounded leading edge and a sharp trailing edge and the blade includes a blade root that connects to a hub of the turbine. Multiple rotor blades are connected at the respective blade root to the hub to create the wind turbine. The blade root includes a plurality of root bushings set within the fiber-reinforced polymer that provides reinforcement to the blade. Bolts are engaged with threads in the root bushings to connect the blade root to the hub.

A typical turbine blade is made by molding two half-shells in a pair of molds. A spar cap (analogous to the spar in an aircraft wing), web stiffeners (ribs) and other details may be optionally installed into one of the blade halves. Adhesive is applied to the bonding perimeter/edges of the first shell, for example, in equally-spaced beads. The second half shell is then turned over, still in its mold tool, and lowered onto the first. The molds are pressed together and the adhesive is allowed to cure, joining the two halves of the blade together. This process by which the two blade halves are joined together with paste is called blade closure.

To improve the performance efficiency of wind turbines in the field, rotor blades are becoming longer at a rapidly growing pace. This rapid increase in blade size heavily impacts many elements of the wind turbine supply chain such as, for example, design, manufacturing, and installation of towers, hubs, gearboxes and rotor blades.

Each new wind turbine blade (whether extended in length or not) includes unique structural design features (e.g., airfoil shape, pitch, etc.). Consequently, transitioning to a new product line often necessitates the alteration of production setup including tooling, equipment (e.g., hinge system and cranes) and sometimes production machinery. As such, the rapid transition to extended-length wind turbine blades has increased production capital expenditure costs significantly for companies in the wind turbine blade manufacturing space.

In a conventional product transition process, i.e. converting the shop floor from the manufacture of one blade design to another, all the tooling, fixtures, clamp systems and hinge units are replaced. In addition, depending on the extent of the design change and based on the existing machinery limits, some of the production units may need to be upgraded if not fully replaced to begin production of a new blade design. Considering both the time required to disassemble and move the old systems out of the production shop and bringing the new systems in (followed by installation and adjustments), conventional transitions are not only expensive but very time-consuming for companies.

The present disclosure describes a modular molding system that may serve as a flexible and adjustable foundation for manufacturing a wide range of blade designs. In accordance with an aspect of the present disclosure, a hinge system is provided that may be adapted to mold a range of blade products with various length and weight.

Additionally, by engineering the distance between each hinge, this system may offer a more uniformly distributed torque across the span of the blade that results in less skin deformation during blade close process leading to a lighter tooling frame and improved quality of the product. The connection between the hinge system and the mold frame is secured via a standard fitting that is identical for all molds and tooling frames.

To increase the flexibility of the production line and to support even faster and less costly transitions, the modular systems described herein may include various additional equipment, such as, for example, a modular clamping system and/or universal fixtures. Moreover, production machinery, such as, for example, resin and/or adhesive injection machines, vacuum and/or heating systems, and/or a laser projection system may be included with this modular system.

FIG. 1 illustrates an exemplary modular molding assembly 1000 for wind turbine blade manufacture according to embodiments of the present disclosure. The modular molding assembly 1000 includes a first base frame 102a and a second base frame 102b that are rotatably coupled together via hinges 104. Each of the base frames 102a, 102b are generally L-shaped (i.e., having a shorter leg, and a longer leg) with the hinges 104 being disposed at the end of the shorter leg. One skilled in the art will recognize that the base frames 102a, 102b may include any suitable shape (not just L-shaped) as is known in the art. Each of the base frames 102a, 102b include a plurality of L-shaped legs that are joined together by hinges 104. In various embodiments, the L-shaped legs may include cross bars (not shown) linking the legs together for reinforced support. Additionally, the L-shaped legs can be a unitary, integrally formed structure, or formed as discrete segments which are joined to make an L-shape subassembly.

The hinges can be located between upper and lower mold halves 108a,180b, e.g. between the leading edges of each mold half, as shown in FIG. 1. In some embodiments, the hinges are disposed on leg/strut 105 at a height (from the shop floor) that is greater than the mold 108 edges/flanges. Additionally, the molds 108a,108b can be spaced from the legs 105 such that the mold 108 does not directly contact the legs 105.

In accordance with an aspect of the disclosure, any number of modular assemblies 1000 can be employed in order to accommodate the size of the blade. In other words, a plurality of modular assemblies 1000 can be placed along the blade span (root-to-tip), as needed to achieve the desired length for a given blade size. In some embodiments each, or select, modular assemblies 1000 can be positioned in an abutting relationship with the adjacent modular assembly 1000. In some embodiments, select modular assemblies 1000 can be spaced from each other (e.g. underlying base frames 102 and/tooling frames 106 can be spaced apart, with the mold halves 108 remaining in abutting fashion to provide a contiguous surface for forming the blade skin). The base frame can be made from a variety of suitably rigid materials, e.g. steel, that retain sufficient strength throughout thermal cycling loads.

The base frames 102a, 102b can be a continuous planar member having a constant cross section along the blade span. Alternatively, the base frames 102a, 102b can be configured as a plurality of slats or "fingers" 102c which extend outwardly from the upright wall section 104. Providing the base frames 102a, 102b as discrete slats which are spaced apart reduces the overall weight of the base frame and thus requires less lifting/rotating force to perform the mold close operation. The slats 102c can be rotated about their respective hinges independently from each other and at alternative rates/speeds. In some embodiments, the slats 102c can all be operated in concert such that all slats 102c are rotated in unison to close the mold. In some embodiments, the slats 102c can be spaced from each other in a uniform manner. In other embodiments the slats 102c can be configured with a variable space therebetween, such that a greater number of slats can be positioned at first/heavier location along the blade span, e.g. blade root to provide more support and lifting force, with a fewer number of slats can be positioned at a second/lighter location along the blade span, e.g. tip. Additionally or alternatively, the slats 102c can be independently moveable relative to each other, e.g. slid along the blade span to cluster or spread out as desired, e.g. proportional to the weight distribution of the blade. In some embodiments, the slats 102c can extend from the vertical wall 105 to an endpoint which coincides with the end/edge of the mold 108, which can also coincide with the end/edge of the tooling frames 106, as shown in FIG. 1.

In some embodiments, as shown in FIG. 1, the base frames 102a, 102b can include interlocking features that engage the tooling frames 106a,106b, respectively. These interlocking features 103 serve to matingly secure or couple the base frame 102 to the tooling frame 106 to prevent relative movement. In the exemplary embodiment shown, each of the base frames 102a, 102b include a plurality of projections 103a, 103b extending perpendicularly, e.g. upwardly, from the longer leg. The projections 103a, 103b may include any suitable predetermined shape, e.g., cylindrical, box, or cube, as is known in the art. The surface area and pressure distribution determine the strength of the "grip"

between the two components, an artisan of skill will understand how to adjust this configuration to meet the requirements of the blade.

The modular molding assembly 1000 further includes a first tooling frame 106a disposed on the first base frame 102a and a second tooling frame 106b disposed on the second base frame 102b. Each of the tooling frames 106a, 106b may include a plurality of recesses on the bottom surface that correspond in shape and size to the projections 103a, 103b of the base frames 102a, 102b. Thus, the tooling frames 106a, 106b may be easily interchangeable with other tooling frames. In some embodiments the projections 103 can be biased, e.g. spring loaded, to extend upward into the female opening/recess within the tooling frame 106 so that the tooling frames 106 can be slid onto the base frame 102, and locked in place with an audible confirmation once the projections 103 are aligned and inserted within the tooling frame openings.

In operation, a tooling frame 106a, 106b which is sized to form a particular blade design specification (i.e. weight, length, camber, etc.), can be loaded onto the underlying base frames 102a, 102b. This loading can be performed by sliding/translational movement of the tooling frame 106 onto the base frame 102 (e.g. in a chordwise direction perpendicular to vertical leg 105, or in spanwise direction). In some embodiments, the tooling frame 106 is moved in a longitudinal path along the blade span with the underlying projections 103 of the base frame 102 received within the slots of tooling frame 102 (e.g. tongue and groove mating) to ensure the tooling frame 106 is securely coupled to the base frame 102. Similarly, the tooling frame 106 can be removed from the base frame 102 and replaced with another tooling frame of a different size/shape/contour to accommodate the dimensions dictated by a second blade specification. Thus, the tooling frames 106 are interchangeable and the base frame can be universally employed to accommodate a variety of blade designs.

The modular molding assembly 100 further includes a first shell mold 108a disposed on the first tooling frame 106a and a second shell mold 108b disposed on the second tooling frame 106b. The first shell mold 108a includes a mold surface corresponding to one half (e.g. suction side) of a wind turbine blade and the second shell mold 108b includes a mold surface corresponding to the other half (e.g. pressure side) of the wind turbine blade. The mold surfaces may be polished and/or treated such that parts molded from the surface may be easily extracted (e.g., do not stick to the mold). The shell molds 108a, 108b each include a perimeter that, when the second shell mold 108b is rotated on top of the first shell mold 108a, the perimeters contact one another. Additionally or alternatively, the shell molds 108 may have a removable layer on the top surface for interfacing with the blade materials, this removable layer can be detached and discarded after formation of the blade to preserve the surface of the shell mold 108 for the next blade formation. For example, a mold flange insert can be attached to the trailing edge sections of the shell molds 108a, 108b to facilitate bonding along the trailing edge.

Figure 2:
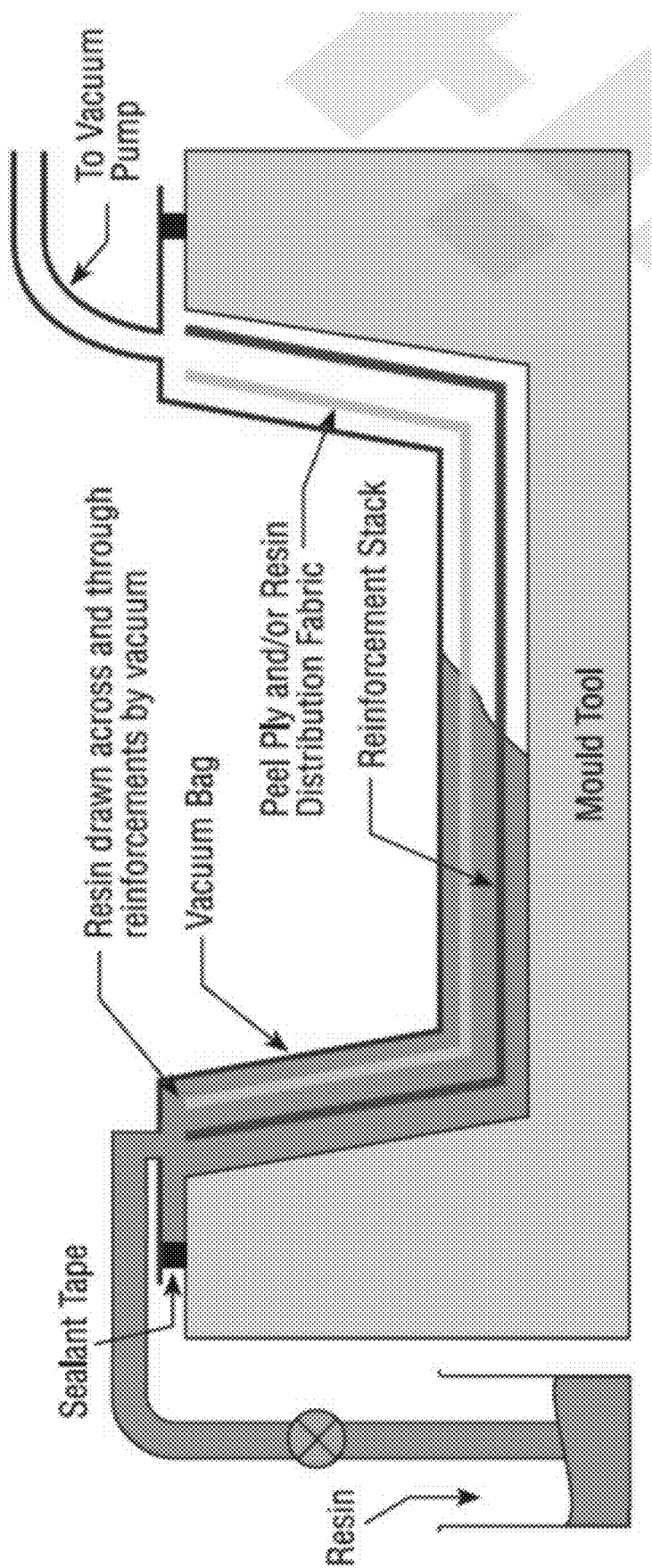
FIG. 2 illustrates an exemplary modular molding system for wind turbine blade manufacture including modular vacuum assisted resin transfer molding, according to embodiments of the present disclosure.

Once the desired combination of modular frames 102, 106 and 108 are assembled, a wind turbine blade is manufactured, with one half of the blade formed in each mold half 108a and 108b. FIG. 2 depicts an exemplary technique for forming the composite blade, i.e. vacuum assisted resin transfer molding (VA-RTM). In such a technique, resin is drawn into the mold via vacuum force, which requires low heat and pressures. This technique allows for large component manufacture with deep draw ad high fiber volume fractions and low void formations.

Figure 3:
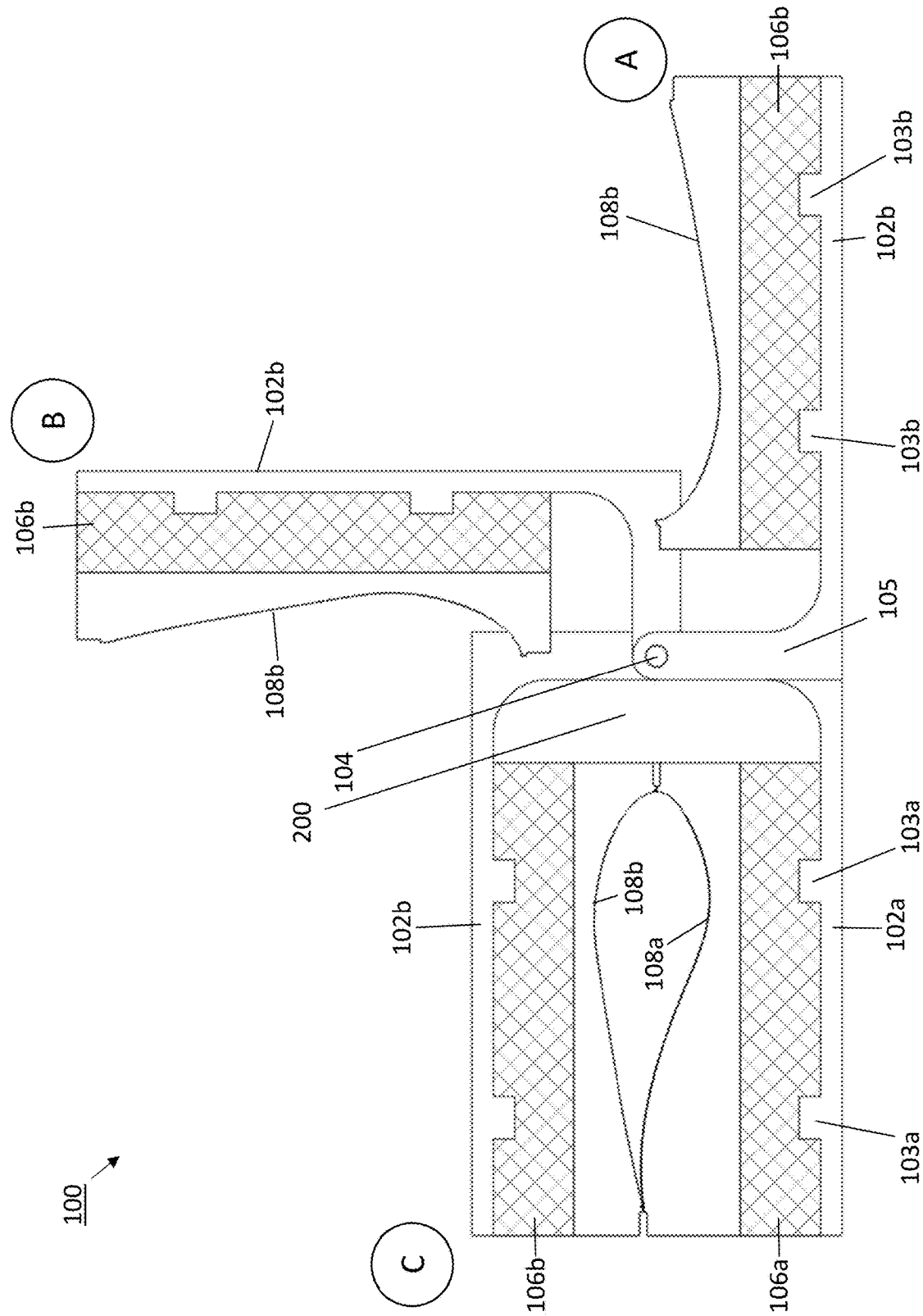
FIG. 3 illustrates the modular molding assembly for wind turbine blade manufacture of FIG. 1 according to embodiments of the present disclosure.

As described above, and shown in FIG. 1, the hinges 104 are disposed at the ends of the shorter/upwardly extending legs 105 of the L-shaped base frames 102a, 102b. The height of the legs 105 may correspond to a plane defined by the perimeters of the shell molds 108a, 108b. In some embodiments the leg 105 extend vertically upward a distance/height which is greater than the height of the molds (108) to provide sufficient clearance between adjacent mold flanges to allow one mold half to be pivoted about the hinge axis and close in a clamshell fashion (as shown in FIG. 3). In some embodiments, the height/location of the hinges 104 can be adjusted to accommodate molds of differing sizes. For example, the leg 105 can be configured with a telescopingly adjustable height to allow repositioning of the hinge 104. The hinges 104 are aligned along the same axis such that the second base frame 102b (in addition to the tooling frame 106b and shell mold 108b) may be rotated about the axis to contact the perimeter of the second shell mold 108b with the perimeter of the first shell mold 108a. Prior to rotation of the second base frame 102b, a composite layup (e.g. wind turbine blade skin) may be prepared and cured on each of the shell molds 108a, 108b.

As blade designs get longer and require more raw materials (and, thus, will be heavier), more hinges 104 and/or frames 102 may be added to the tooling frame thus providing the necessary torque required to close the molds. In other words, the final torque capacity of the system is the accumulative torque values provided by each hinge 104. The movement of the mold halve(s) can be powered via electrical power means (e.g. servo motor driving mechanical gears), hydraulics and/or pneumatic power.

In various embodiments, the base frames, tooling frames, and/or shell molds may be made out of any suitable metal as is known in the art. In various embodiments, the mold and/or barriers may include a metal, such as, for example, aluminum, steel, stainless steel, titanium, tantalum, tungsten, or any suitable combination of metals (e.g., a metal alloy). In various embodiments, the base frames, tooling frames, and/or shell molds may include a polymer, for example, polyethylene, polyurethane, polyethylene terephthalate, polyvinyl chloride, etc. In various embodiments, the base frames, tooling frames, and/or shell molds may be made by machining (e.g., CNC machining), 3D printing (e.g., using Direct Metal Laser Sintering (DMLS) and Fused Deposition Modeling (FDM)), open molding, closed molding, resin infusion, compression molding, composite hand layup, injection molding, pultrusion, automated fiber placement, tube rolling, automated tape laying, filament winding, resin transfer molding, or any suitable manufacturing technique as is known in the art. One skilled in the art will recognize that any suitable 3D printing technique may be used to manufacture the components described herein.

FIG. 3 illustrates the modular molding assembly for wind turbine blade manufacture of FIG. 1 according to embodiments of the present disclosure. In particular, FIG. 3 illustrates three snapshots during the mold closure process represented by steps A, B, and C. In step A, the base frames 102a, 102b are laid flat on a surface and the longer legs of both base frames 102a, 102b are coplanar with one another. In step B, the second base frame 102b (with tooling frame 106b and shell mold 108b) is rotated about the axis of the hinges 104 such that the second base frame 102b makes a 90° angle with the first base frame 102a. In step C, the second base frame 102b has been rotated about the axis of the hinges 104 such that the perimeter of the second shell mold 108*b* contacts the perimeter of the first shell mold 108*a*. Although the embodiment depicted illustrates the mold half 102*b* rotating, it is possible to rotate mold half 102*a*, alone or in tandem with mold half 102*b* during the mold-close operation. While not shown in FIG. 3, the shell molds 108*a*, 108*b* may each include a fabricated composite wind turbine blade half. Using the modular molding assembly 100 described herein may allow for blade closure to be easily performed by, for example, applying a paste to one or both blade halves (while still in the respective shell mold) and rotating the second base frame 102*b* such that the perimeters of the shell molds 108*a*, 108*b* contact. The second blade half can be held against, or within, its mold via vacuum force to ensure there is no undesired displacement when rotating or pivoting the second blade half about the hinge to close the molds.

As described above, the tooling frames 106 and molds 108 can be spaced from the leg 105, such that once the rotation of the second mold is completed and the mold is closed, a space or cavity 200 remains between the leading edge of the blade and the leg 105. This space 200 allows for a technician to access the leading edge and perform any subsequent surface treatments (resin injection, inspection, sanding, etc.).

Figure 4:
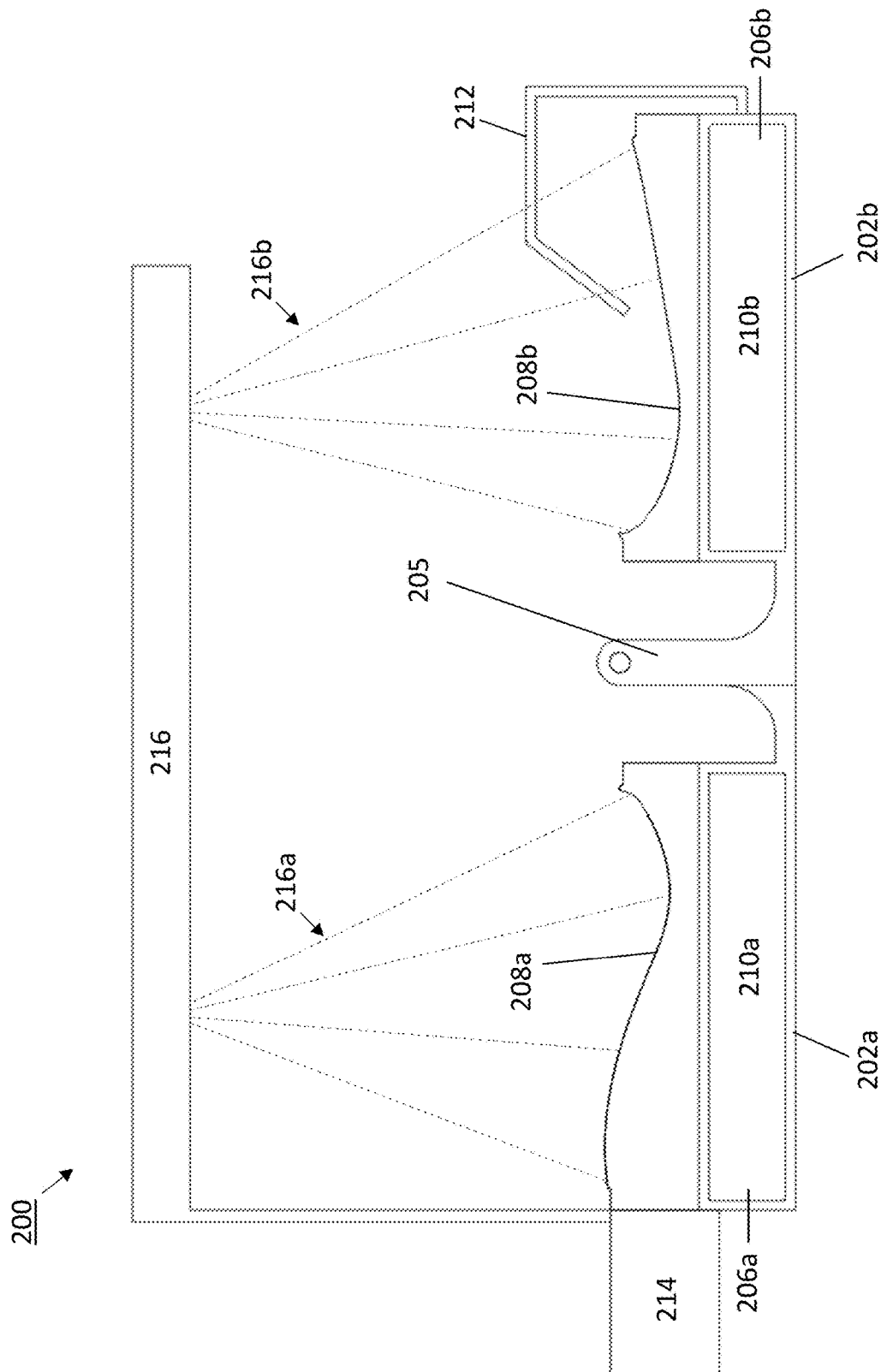
FIG. 4 illustrates an exemplary modular molding system for wind turbine blade manufacture according to embodiments of the present disclosure.

FIG. 4 illustrates an exemplary modular molding system 200 for wind turbine blade manufacture according to embodiments of the present disclosure. The system 200 in FIG. 4 may include similar components to those in FIGS. 1 and 3. For example, the system 200 includes base frames 202*a*, 202*b* coupled together via hinges 204, tooling frames 206*a*, 206*b*, and shell molds 208*a*, 208*b*.

The system 200 may further include a clamping system 214. The clamping system may include any clamping mechanisms as are known in the art to thereby clamp the first shell mold 208*a* and the second shell mold 208*b* together after the blade closure process to allow paste applied to the one or more blade halves to be evenly dispensed along the trailing edge flanges, and cured. The clamp(s) can engage both mold halves, extend along the entire blade span, or only at certain locations. For example, the clamp 214 can include retractable slats/fingers (similar to the slats/fingers described above with respect to base frame 102) which extend into channels formed in the tooling frames 206. In accordance with an aspect of this disclosure, the clamping apparatus is part of the modular system, thus there is no need to change the clamp(s) each time a mold is changed.

The system 200 may further include universal fixtures 212. These fixtures 212 can be removably attached to the mold frames 206. Such universal fixtures refers to any fixturing tool (e.g. layup segment placement, securing, surface treating, etc.) that is not specific to a certain blade type and therefore remains constant while different blade models are formed with the modular platform.

The system 200 may further include a resin and/or paste injection system 210*a*. The injection system can be housed, at least partially, within a mold frame 206 as shown. In some embodiments the injection system includes a plurality of conduits and a pump mechanism, to generate the force to deliver the resin/paste, housed within the mold frame 206. The adhesive paste can be dispensed around the perimeter of the lower mold half 208*a*, along leading and trailing edges either as a continuous bead or as discrete amounts at select locations. Similarly to the clamp and universal fixtures described above, the resin injection system is not specific to a certain blade type and therefore remains fixed while different blade models are formed with the modular platform.

The system 200 may further include a vacuum and/or thermal (e.g. heating) system 210*b*. Similar to the injection system described above, the vacuum and thermal system(s) can be housed, at least partially, within a mold frame 206 as shown. In some embodiments the injection system includes a plurality of conduits dispersed in any desired pattern about the edge of the mold 208*b*, and a pump mechanism to generate the force to deliver the resin/paste. The heating medium can be fluid, e.g. water or air; additionally or alternatively, the heating can be achieved via conductive wiring. Similarly to the clamp and universal fixtures described above, the vacuum system is not specific to a certain blade type and therefore remains fixed while different blade models are formed with the modular platform.

The system 200 may further include a laser projection system 216. The laser projection system 216 may project one or more light patterns 216*a*, 216*b* onto the shell molds 208*a*, 208*b* to guide placement of fibers and/or fabric during the composite layup process. The laser projection system 216 may include the laser projection system described in U.S. application Ser. No. 16/235,325 and U.S. patent application Ser. No. 16/023,891 which are hereby incorporated by reference herein in their entirety.

Figures 5A, 5B:
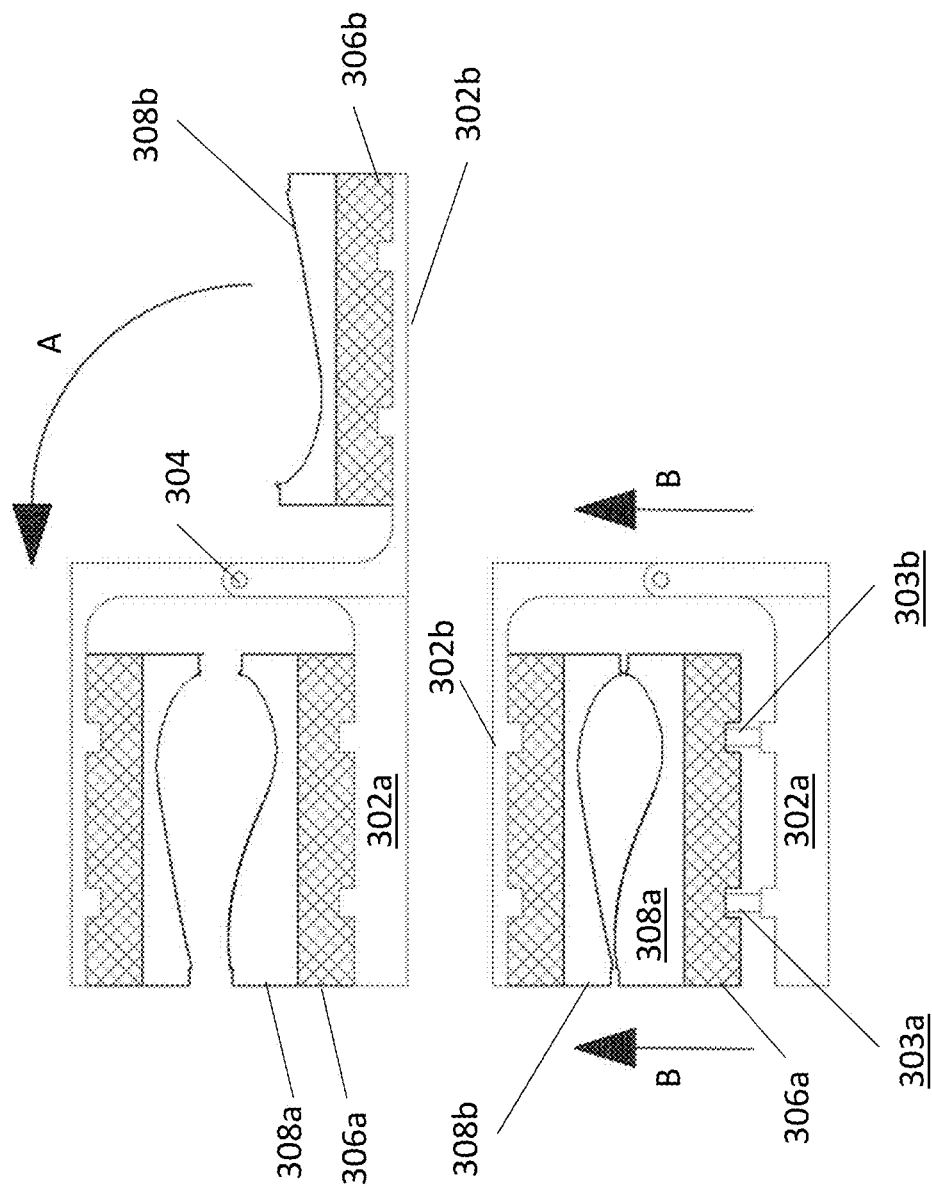
FIG. 5A-B illustrate an exemplary modular molding system, in an open FIG. 5A and closed FIG. 5B configuration, for wind turbine blade manufacture including modular mold actuators according to embodiments of the present disclosure.

In accordance with another aspect of the disclosure, the modular assembly disclosed herein can include a plurality of actuators 303 to facilitate closing of the two mold halves and facilitate clamping to disperse the adhesive dispensed between the mold halves. In the exemplary embodiment shown in FIG. 5. As shown, the actuators 303 can be linear actuators incorporated into the interlocking projections (shown as element 103 in FIG. 3) which serve to register and lock the base frame 302*a* to the tooling frame 306*a*. The actuators can powered by electrical, pneumatic or hydraulic means and extend upwardly in a telescoping fashion from the lower portion which serves as the interlocking projection to register/lock to the tooling frame 306*a*.

In some embodiments a plurality of actuators 303 are provided, which can operate simultaneously or independently, and with a uniform or varied force distribution along the blade span. In operation, after the blade skins are formed in the molds 308*a*, 308*b*, a first mold half is rotated about hinge 304 (as shown by arrow "A" in FIG. 5) to align the mold flanges along the perimeter of the mold halves. In some embodiments, the upper mold 308*b* can remain spaced from the lower mold 308*a* such that the mold is not yet closed/sealed. After the adhesive paste is applied to the mold flanges, the actuators 303 can be operated to elevate the lower tooling frame 306*a* and the mold 308*a* upward (as shown by arrow "B" in FIG. 5) and into sealing engagement with the upper mold 308*b* and tooling frame 306*b*. This actuation permits blade closure, while protecting the leading edge from damage (e.g. allows for a removable leading edge mold flange to be placed between upper and lower molds). The base frame 302*a* can remain fixed to the floor when the actuators 303*a*, 303*b* operate so that the tooling frame 306*a* moves relative to the base frame 302*a*. Also, the hinge 304 can be locked in position to resist the upward force generated by the actuators 303 so as to prevent the (presently closed) mold from opening. Additionally, in some embodiments, the actuators 303 can work in concert with the clamp 214 (as shown in FIG. 4) to supplement the clamping force and shorten manufacturing cycle time.

Figure 6:
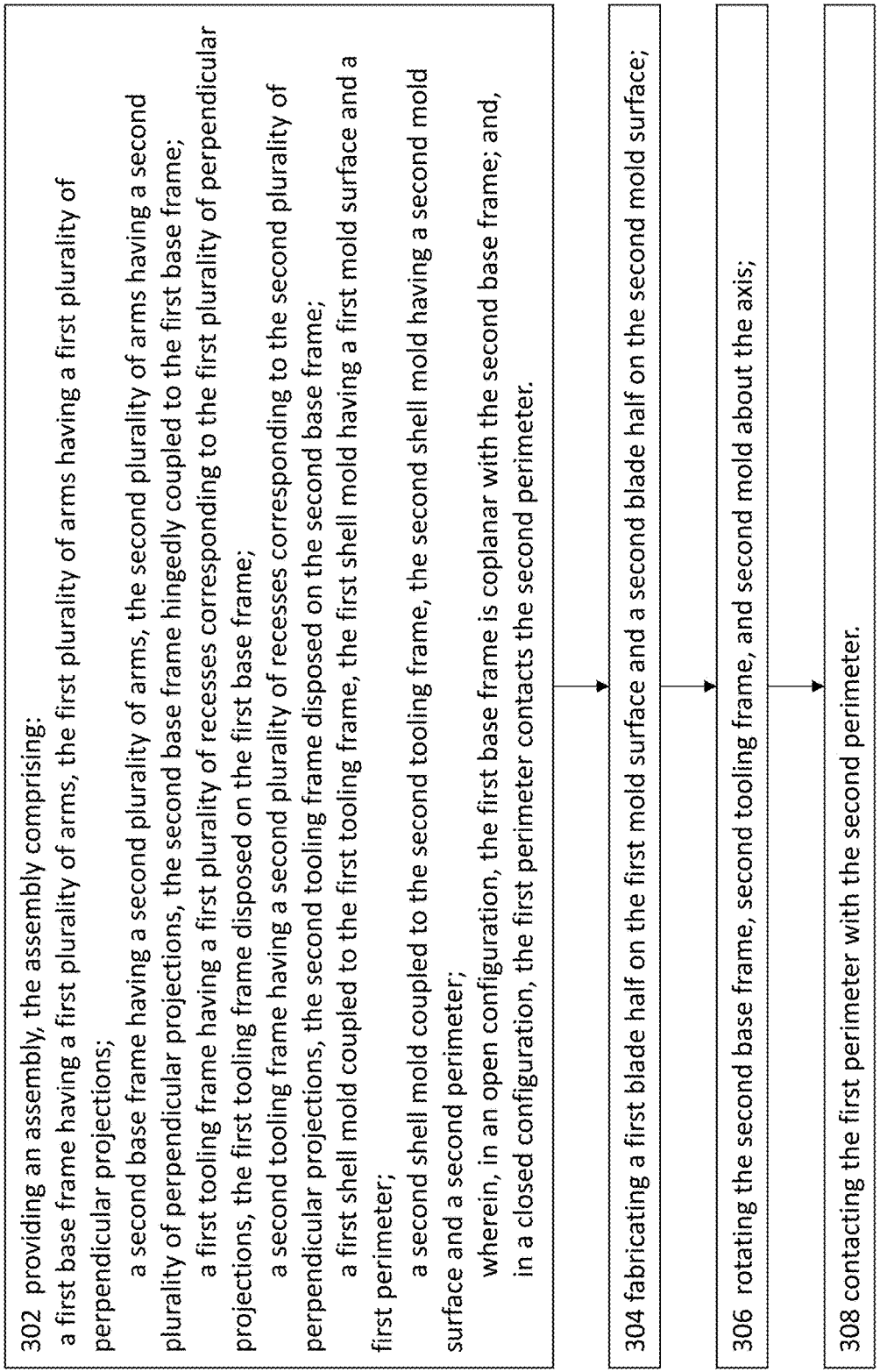
FIG. 6 illustrates a method of closing a modular mold for wind turbine blade manufacture according to embodiments of the present disclosure.

FIG. 6 illustrates a method 300 of blade closure using a modular mold for wind turbine blade manufacture according to embodiments of the present disclosure. At 302, a modular molding assembly for a wind turbine blade as described above is provided. At 304, a first blade half is fabricated on the first mold surface and a second blade half is fabricated on the second mold surface. The blade halves may include a polymer reinforced fiber or fabric. The fiber or fabric used to fabricate the blade halves may be a glass fiber, carbon fiber, and/or aramid fiber and the polymer may include any suitable polymer resin such as, for example, polyester, epoxy, and/or vinyl ester. The polymer resin may include any suitable additives and may be cured at room temperature or at a predetermined higher temperature using, e.g., an oven. At 306, the second base frame, second tooling frame, and second mold are rotated about the hinge axis. At 308, the first perimeter of the first mold surface is contacted with the second perimeter of the second mold surface.

FIG. 7 illustrates a method 400 of substituting wind turbine shell molds in a modular assembly for wind turbine blade manufacture according to embodiments of the present disclosure. At 402, a modular molding assembly for a wind turbine blade as described above is provided. At 404, the first shell mold and first tooling frame are removed from the first base frame. At 406, the second shell mold and the second tooling frame are removed from the second base frame. At 408, a third tooling frame having a third plurality of recesses is disposed on the first base frame. In various embodiments, the third plurality of recesses may match the size and/or shape of the first plurality of projections on the second base frame. The third tooling frame is coupled to a third shell mold that is different from the first shell mold. At 410, a fourth tooling frame having a fourth plurality of recesses is disposed on the second base frame. In various embodiments, the fourth plurality of recesses may match the size and/or shape of the second plurality of projections on the second base frame. The fourth tooling frame is coupled to a fourth shell mold that is different from the second shell mold. In various embodiments, the first and second plurality of projections are the same size and/or shape and the first and second plurality of recesses are the same size and/or shape.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wind turbine blade assembly system comprising:
   a first base frame having an L-shape with a first leg and a second leg, the second leg having at least one projection;
   a second base frame having an L-shape with a third leg and a fourth leg, the fourth leg having at least one projection, the second base frame hingedly coupled to the first base frame via at least one hinge disposed on each of the first leg and the third leg;
   a first tooling frame having at least one recess corresponding to the at least one projection of the first base frame, the first tooling frame disposed on the first base frame;
   a second tooling frame having at least one recess corresponding to the at least one projection of the second base frame, the second tooling frame disposed on the second base frame;
   a first shell mold coupled to the first tooling frame, the first shell mold having a first mold surface and a first perimeter;
   a second shell mold coupled to the second tooling frame, the second shell mold having a second mold surface and a second perimeter;
   the first tooling frame removably coupled to the first base frame;
   wherein, in an open configuration, the first base frame is coplanar with the second base frame; and, in a closed configuration, the first perimeter vertically aligns with the second perimeter,
   wherein at least one of the projections of the at least one projection of the second leg includes an actuator for elevating the first tooling frame towards the second tooling frame and registering the first base frame relative to the first tooling frame.

2. The system of claim 1, wherein, in the open configuration, at least one leg of the first base frame is coplanar with at least one leg of the second base frame.

3. The system of claim 1, wherein a plurality of hinges are disposed along an axis.

4. The system of claim 3, wherein the plurality of hinges is disposed at a predetermined distance away from the first shell mold and the second shell mold.

5. The system of claim 1, further comprising a clamp disposed on the first tooling frame.

6. The system of claim 1, further comprising a resin injection device disposed within the first tooling frame.

7. The system of claim 1, further comprising a paste injection device disposed within the first tooling frame.

8. The system of claim 1, further comprising a vacuum device disposed within the second tooling frame.

9. The system of claim 1, further comprising a heating device disposed within the second tooling frame.

10. The system of claim 1, further comprising a laser projection system configured to project a pattern on each of the first shell mold and the second shell mold.

11. The system of claim 1, further comprising a universal fixture coupled to the second tooling frame.

12. The system of claim 1, wherein the second tooling frame is removably coupled to the second base frame.

13. The system of claim 12, wherein at least one of the first tooling frame and second tooling frame is slidably removed from at least one of the first and second base frames.

14. The system of claim 13, wherein the first tooling frame is configured for sliding in a chordwise direction.

15. The system of claim 13, wherein a third tooling frame is disposed on the first base frame.

16. The system of claim 1, wherein at least one of the first shell mold and second shell mold is slidably removed from at least one of the first and second base frames.

* * * * *